US008457625B2

(12) United States Patent
Takai

(10) Patent No.: US 8,457,625 B2
(45) Date of Patent: Jun. 4, 2013

(54) MOBILE COMMUNICATION SYSTEM, BASE STATION, TRANSMISSION POWER CONTROL METHOD, AND PROGRAM

(75) Inventor: Kenichi Takai, Tokyo (JP)

(73) Assignee: NEC Corporation, Tokyo (JP)

(*) Notice: Subject to any disclaimer, the term of this patent is extended or adjusted under 35 U.S.C. 154(b) by 288 days.

(21) Appl. No.: 12/920,766

(22) PCT Filed: Mar. 5, 2009

(86) PCT No.: PCT/JP2009/054212
§ 371 (c)(1), (2), (4) Date: Sep. 2, 2010

(87) PCT Pub. No.: WO2009/110572
PCT Pub. Date: Sep. 11, 2009

(65) Prior Publication Data

US 2011/0009115 A1 Jan. 13, 2011

(30) Foreign Application Priority Data

Mar. 5, 2008 (JP) .............................. P2008-054242

(51) Int. Cl.
*H04W 24/10* (2009.01)

(52) U.S. Cl.
USPC ..... 455/423; 455/67.13; 455/135; 455/161.3; 455/522; 455/436

(58) Field of Classification Search
None
See application file for complete search history.

(56) References Cited

U.S. PATENT DOCUMENTS

| | | | | |
|---|---|---|---|---|
| 6,771,934 | B2 * | 8/2004 | Demers et al. | 455/63.1 |
| 2006/0281462 | A1 * | 12/2006 | Kim et al. | 455/436 |
| 2007/0213086 | A1 * | 9/2007 | Claussen et al. | 455/513 |

FOREIGN PATENT DOCUMENTS

| | | | |
|---|---|---|---|
| JP | 10-32540 | A | 2/1998 |
| JP | 2000138633 | A | 5/2000 |
| JP | 2000217141 | A | 8/2000 |
| JP | 2003318819 | A | 11/2003 |
| JP | 2004304394 | A | 10/2004 |
| JP | 2005020770 | A | 1/2005 |
| JP | 2006311459 | A | 11/2006 |
| JP | 2007295318 | A | 11/2007 |

OTHER PUBLICATIONS

International Search Report for PCT/JP2009/054212 mailed Jun. 9, 2009.

* cited by examiner

*Primary Examiner* — Yuwen Pan
*Assistant Examiner* — Fanghwa Wang

(57) ABSTRACT

A mobile communication system including base stations, wherein each base station includes: a report unit which exchanges a current target value of communication quality for a mobile station with other base stations; a comparison unit which compares a current target value of a current station with target values of the other base stations; and a management unit which changes the current target value based on the comparison result of the comparison unit.

12 Claims, 6 Drawing Sheets

MOBILE COMMUNICATION SYSTEM, BASE STATION, TRANSMISSION POWER CONTROL METHOD, AND PROGRAM

This application is the National Phase of PCT/JP2009/054212, filed Mar. 5, 2009, which claims priority to and the benefit of Japanese Patent Applications No. 2008-054242 filed on Mar. 5, 2008, the disclosure of which is incorporated herein by reference.

TECHNICAL FIELD

The present invention relates to a mobile communication system, a base station, a transmission power control method, and a program.

BACKGROUND ART

With regard to a third generation in mobile communication systems (Long Term Evolution (LTE), Beyond3G), stable service capable of both voice communication and high-speed data communication is being provided. In the future, as the transition from the voice communication to the data communication further progresses, high-speed communication having a throughput of current wired communication will be required.

Meanwhile, although the third generation system realizes highly flexible functions and services, the device cost tends to increase. There is also a problem in that an investment of an operator and a device development vendor is increasing.

Based on the above-described circumstances, in the next generation system, techniques not only for achieving high performance but also for simplifying functions of nodes constituting a system are being discussed in view of cost performance.

A configuration of the third generation system for integrating the function of a radio base station (NodeB) and the function of a radio network controller (RNC) which controls the radio base station, to realize a single node (accommodated in the radio base station) is being discussed. Therefore, the radio base station is required to autonomously perform management and control in the network.

The mobile communication system includes a host station (a radio network controller) which controls transmission power of a base station (a radio base station), and the host station controls the transmission power of the base station.

For example, the host station controls the transmission power to satisfy a target value (hereinafter, referred to as "control target value") of communication quality for a mobile station with which each base station is communicating. The host station controls each of the base stations based on a report from each of the base stations to prevent the control target value from being remarkably unbalanced between the base stations or to prevent a control target value exceeding the total transmission power range of the base station from being set (for example, see Patent Document 1).

Meanwhile, in the next generation system, it is necessary for a function of the host station to be integrated into the base station, and for the base station to execute the above-described control operation autonomously. Generally, as methods of autonomously performing a control operation in a node (corresponding to the base station) that constitutes a network, the following methods (1) to (3) have been known: (1) a method of performing control such that a previously determined (fixed) target value is set for each control parameter, and all nodes (base stations) satisfy the target value; (2) a method of performing control through a virtual host station which is set by having an arbitrary node (base station) to function as the host station; and (3) a method of performing mutual monitoring and control between nodes (base stations).

However, in the above-described mobile communication system, in the case of method (1), there is little flexibility for growth or change of the network. Particularly, when the number of the mobile stations connected with the base station dynamically changes or installation environments of the base stations are individually different depending on a district or an operation environment as in the mobile communication system, it may be impossible for practical use.

Further, in the above-described mobile communication system, in the case of method (2), a load may be concentrated on the base station serving as the virtual host station, and a load balance with other base stations may be lost, thereby influencing or inducing failure on an original function as the base station.

Further, in the above-described mobile communication system, in the case of the method (3), it is difficult to optimize a relationship between nodes which perform mutual monitoring, and if a mutual relationship is improperly set, control is biased in one direction. For example, if all of the base stations increase the transmission power, an upper limit of the total transmission power may be finally reached, leading to network failure.

A technique disclosed in Patent Document 1 has the same problems as in the cases of the methods (1) to (3) if the function of the host station is integrated into the base station.

Patent Document 1: Japanese Unexamined Patent Publication, First Publication No. 2006-311459

DISCLOSURE OF INVENTION

Problem to be Solved by the Invention

Therefore, it is an object of the present invention to resolve the above-mentioned problems and provide a mobile communication system, a base station, a transmission power control method, and a program in which each base station can perform autonomous transmission power control balanced between the base stations.

Means for Solving the Problem

According to an aspect of the present invention, there is provided a mobile communication system including base stations, wherein each base station includes: a report unit which exchanges a current target value of communication quality for a mobile station with other base stations; a comparison unit which compares a current target value of a current station with target values of the other base stations; and a management unit which changes the current target value based on the comparison result of the comparison unit.

According to another aspect of the present invention, there is provided a base station including: a report unit which exchanges a current target value of communication quality for a mobile station with other base stations; a comparison unit which compares a current target value with target values of the other base stations; and a management unit which changes the current target value based on the comparison result of the comparison unit.

According to still another aspect of the present invention, there is provided a transmission power control method, causing each base station to execute: a report process of exchanging a current target value of communication quality for a mobile station with other base stations; a comparison process of comparing a current target value of a current station with target values of other base stations; and a management process of changing the current target value based on the comparison result of the comparison process.

According to still another aspect of the present invention, there is provided a program executed by a computer inside each base station, the program including: a report process of exchanging a current target value of communication quality for a mobile station with other base stations; a comparison process of comparing a current target value with target values of other base stations; and a management process of changing the target value based on the comparison result of the comparison process.

Effect of the Invention

According to the above-described configuration and operation, the present invention allows each base station to perform autonomous transmission power control balanced between the base stations.

REFERENCE SYMBOLS

1, 203, 204 and 205: Base station
11: Control target value report unit
12: Comparison unit
13: Communication quality management unit
200 to 202: Cell
500 to 502: Group

BEST MODE FOR CARRYING OUT THE INVENTION

Figure 1:
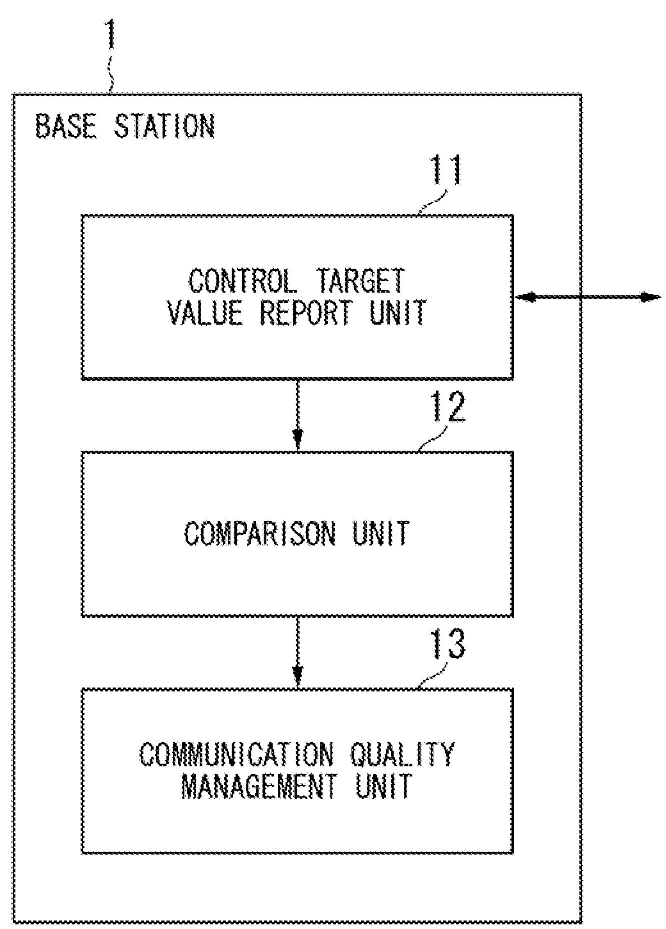
FIG. 1 is a block diagram illustrating an example of the configuration of a base station according to the present invention.

Embodiments of the present invention will now be described with reference to the accompanying drawings. First, an overview of a transmission power control method according to embodiments of the present invention will be described with reference to FIG. 1. FIG. 1 is a block diagram illustrating an example of the configuration of a base station (a radio base station) according to embodiments of the present invention.

In FIG. 1, a base station 1 includes a control target value report unit 11 which exchanges a control target value (a target value of communication quality for a mobile station) with other base stations, a comparison unit 12 which compares its control target value with the control target values of other stations, and a communication quality management unit 13 which performs communication quality management (transmission power control) for the mobile station based on the comparison result of the comparison unit 12.

In embodiments of the present invention, three base stations disposed adjacent to each other are grouped into one group, and the control target values of the base stations are mutually reported within the group. Each base station compares its control target value with the reported control target values of other base stations and decreases its control target value when its control target value is greater than the control target values of at least two other base stations. The base station increases its control target value when its control target value is smaller than the control target values of the at least two other base stations. Further, the base station does not change its target value when its control target value is between the control target values of the other two base stations.

In order to maintain a specific level of quality in communication with the mobile station in a cell, each base station dynamically manages and controls its control target value depending on a load state or an environmental condition within the cell. In addition, by controlling the control target value as described above, each base station performs autonomous control which is balanced within the group while information-exchanging the control target value of each base station between the groups:

That is, according to embodiments of the present invention, each base station can perform the autonomous transmission power control balance between the base stations on the communication quality between the mobile station and the radio base station in the mobile communication system.

Figure 2:
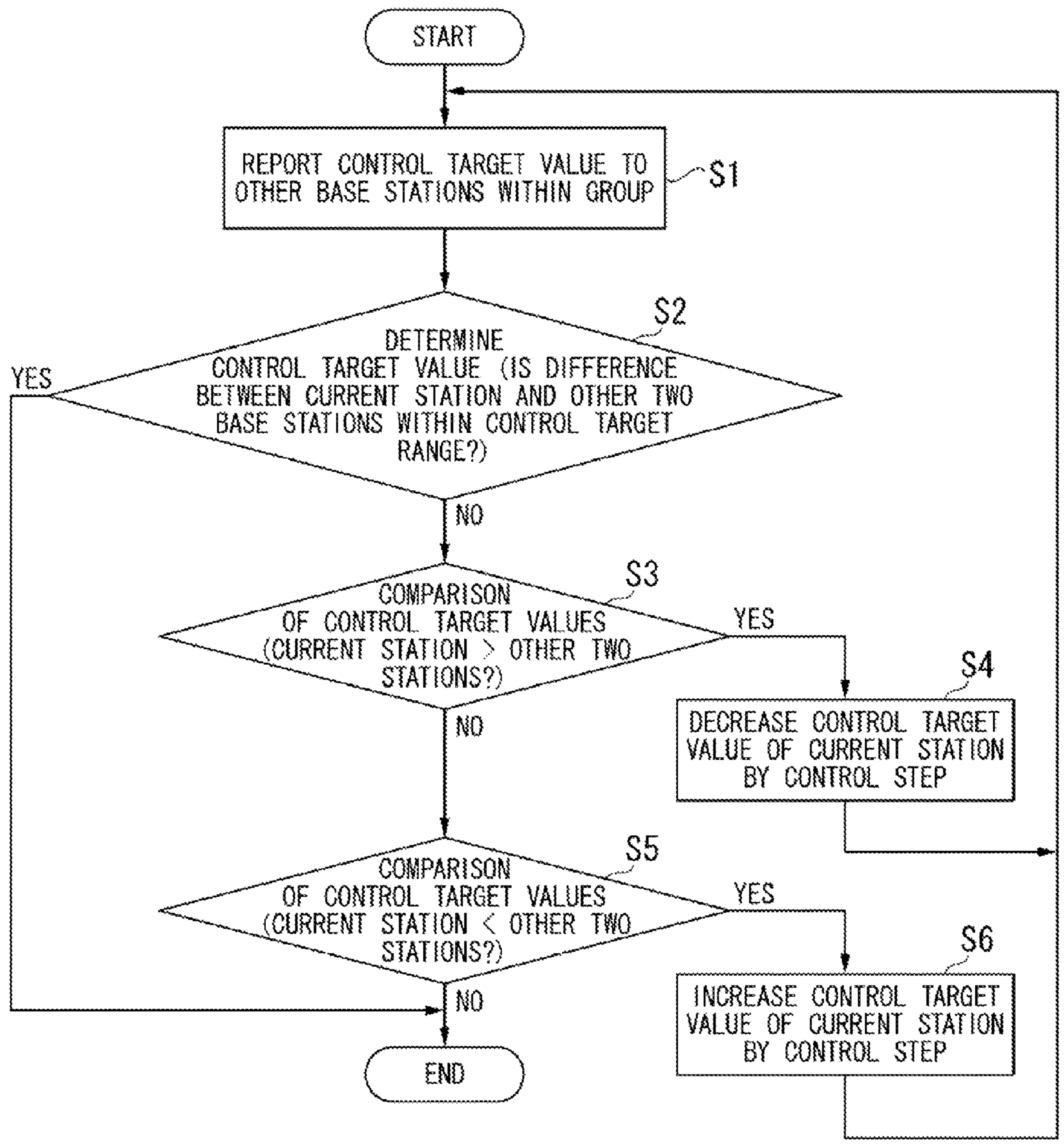
FIG. 2 is a flowchart illustrating a transmission power control method in a base station according to a first embodiment of the present invention.

FIG. 2 is a flowchart illustrating a transmission power control method in a base station according to a first embodiment of the present invention. A base station according to the first embodiment of the present invention has the same configuration as the base station 1 of FIG. 1. A transmission power control method in a base station according to the first embodiment of the present invention will be described with reference to FIGS. 1 and 2.

The base station 1 and two other base stations belonging to the same group report respective control target values to one another and share information on the control target values using the control target value report unit 11 (step S1 in FIG. 2). The base station 1 determines whether a difference between its control target value and the reported control target values of the other two base stations is within a certain range using the comparison unit 12 (step S2 in FIG. 2).

When it is determined that the difference between its control target value and the control target values of the other two base stations is greater than the certain range, the base station 1 compares its control target value with the control target values of the other two base stations using the comparison unit 12 to determine whether its control target value is the highest (step S3 in FIG. 2). When it is determined that its control target value is the highest, the base station 1 decreases the control target value by a previously determined control step using the communication quality management unit 13 (step S4 in FIG. 2).

Further, when it is determined that its control target value is not highest, the base station 1 compares its control target value with the control target values of the other two base stations using the comparison unit 12 to determine whether its control target value is the lowest (step S5 in FIG. 2). When it is determined that its control target value is the lowest, the base station 1 increases the control target value by a previously determined control step using the communication quality management unit 13 (step S6 in FIG. 2).

Figure 3:
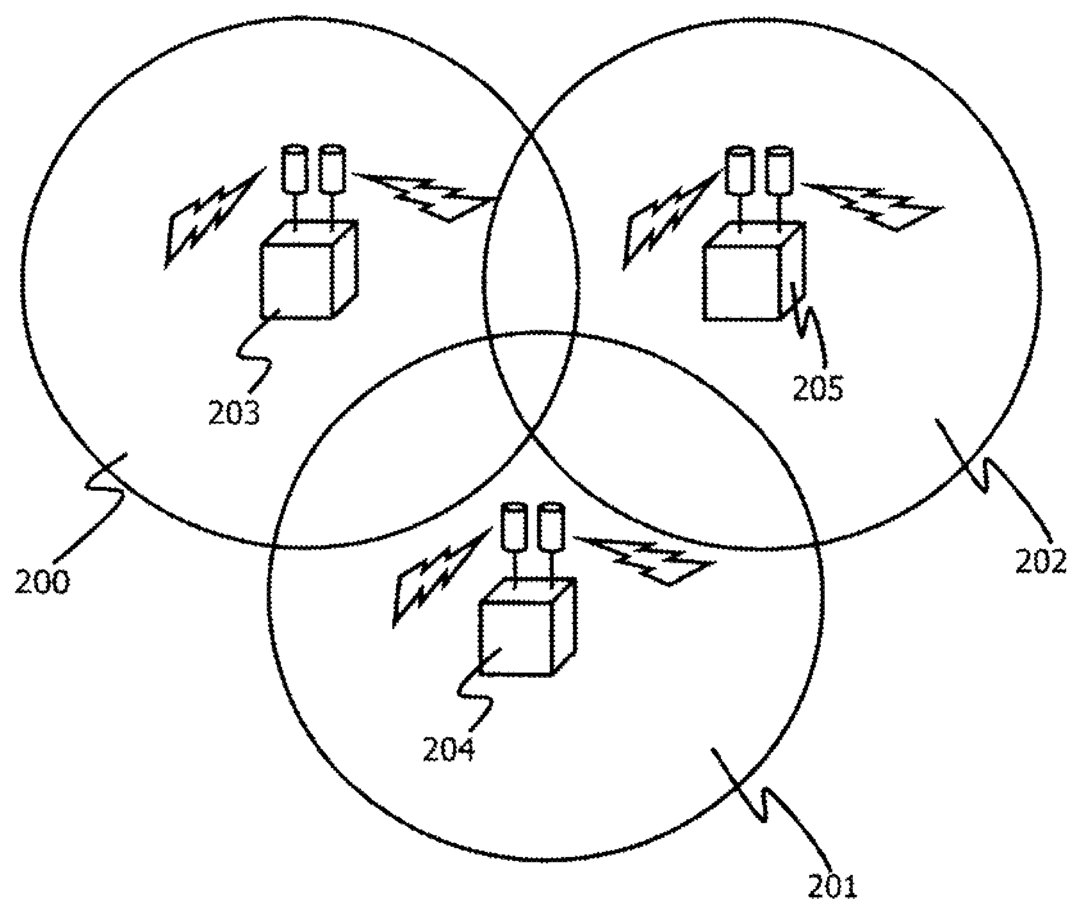
FIG. 3 illustrates an arrangement of base stations and cells thereof in a mobile communication system according to the first embodiment of the present invention.
Figure 4:
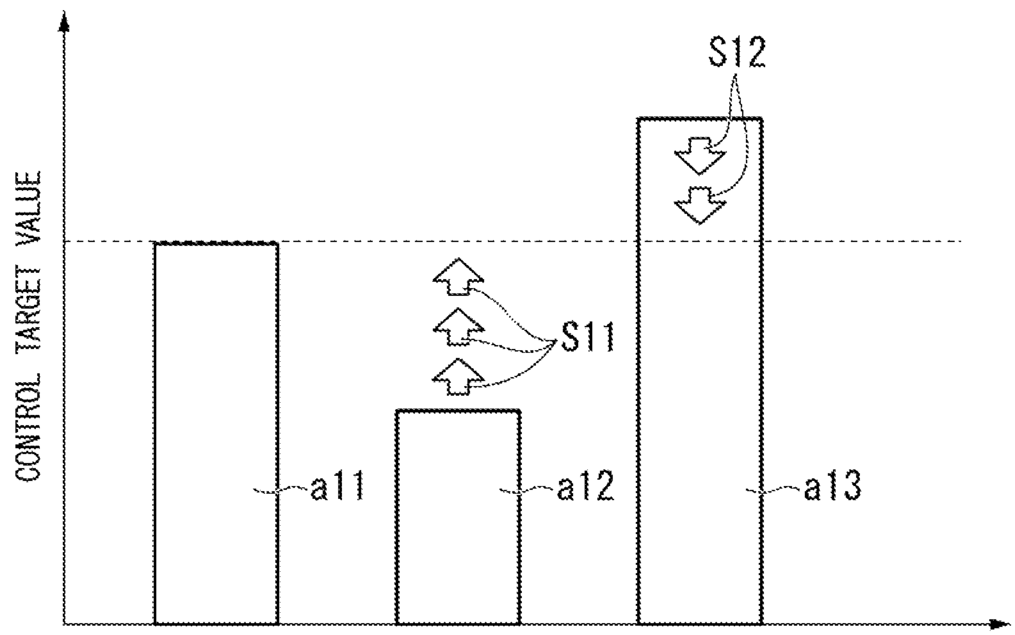
FIG. 4 illustrates states of control target values of base stations at an arbitrary time according to the first embodiment of the present invention.
Figure 5:
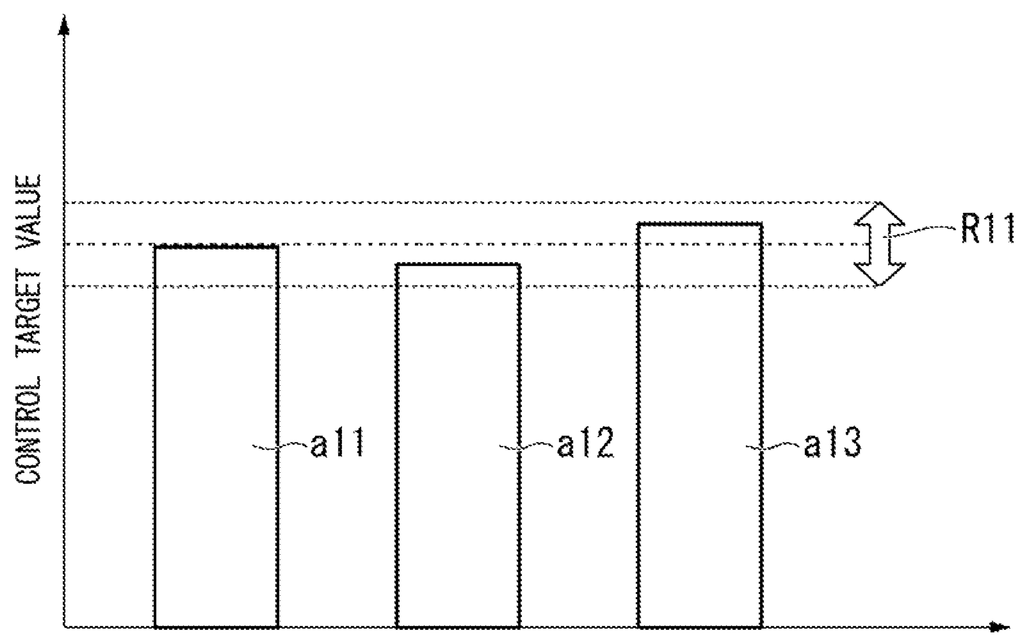
FIG. 5 illustrates states of control target values of base stations after the transmission power control method according to the first embodiment of the present invention is applied.

FIG. 3 illustrates an arrangement of the base stations and the cells (communication coverage) thereof in the mobile communication system according to the first embodiment of the present invention. FIG. 4 illustrates states of the control target values of the base stations at an arbitrary time according to the first embodiment of the present invention. FIG. 5 illustrates states of the control target values of the base stations after the transmission power control method according to the first embodiment of the present invention is applied.

An operation of the mobile communication system according to the first embodiment of the present invention will be described with reference to FIGS. 1 to 5.

In FIG. 3, base stations 203, 204, and 205 correspond to cells 200, 201, and 202, respectively, and are disposed adjacent to one another. The base stations 203, 204, and 205 have the same configuration as the base station 1 of FIG. 1. As described above, the base stations 203, 204, and 205 have control target values for the communication quality with mobile stations (not shown) within the cells 200, 201, and 202 and perform the transmission power control to satisfy the target values.

According to the present embodiment, as described above, the control target value is managed and controlled, and as a result, the transmission power control of the base stations 203, 204, and 205 is performed.

FIG. 4 illustrates states of the control target values of the base stations 203, 204, and 205 at an arbitrary time. That is, a graph a11 indicates the control target value of the base station 203. A graph a12 indicates the control target value of the base station 204. Further, a graph a13 indicates the control target value of the base station 205.

Here, the base station 205 has the highest target value, and the base station 203 and the base station 204 have the next highest target values in that order.

First, as illustrated in FIG. 3, the three base stations 203, 204, and 205, which are disposed adjacent to one another, are grouped into one group, and information of the control target values is mutually reported among the base stations 203, 204, and 204 within the group according to the process of step S1 in FIG. 2.

At this point in time, the base stations 203, 204, and 205 proceed to the process of step S2 in FIG. 2 and determine a difference of the control target value between themselves and the other two base stations. In the present embodiment, a control target range R11 (see FIG. 5) for performing the determination is determined in advance. When the control target values of all of the base stations 203, 204, and 205 stay within a specific range, i.e., within the control target range R11, the control target value control is not performed and the process is terminated.

Further, in the present embodiment, when the control target value of any of the base stations exceeds the control target range, the process proceeds to step S3 in FIG. 2, in which it is determined whether the control target value of the current station is the highest in the group. As a result, when it is determined that the control target value of the current station is the highest in the group, in the present embodiment, the control (the process of step S4 in FIG. 2) of reducing of the current station is performed. The process then returns to step S1, in which the control target value of each base station in the group is rechecked. In the present embodiment, a decrement amount of the control target value decreased by one control operation is determined as a control step in advance, and the control target value is decreased by the control step.

Meanwhile, in the present embodiment, when the control target value of any of the other base stations is higher than the control target value of the current station, the process proceeds to step S5 in FIG. 2, in which it is determined whether the control target value of the current station is the lowest in the group. As a result, when it is determined that the control target value of the current station is the lowest in the group, in the present embodiment, the control (the process of step S6 in FIG. 2) of increasing the control target value of the current station is performed. The process then returns to step S1, in which the control target value of each base station in the group is rechecked. In the present embodiment, an increment amount of the control target value increased by one control operation is determined as a control step in advance, and the control target value is increased by the control step.

In the present embodiment, when the control target value of the current station is between the control target values of the other two base stations, the control target value of the current station is not changed, and the process is terminated.

When the control target values of the base stations 203, 204, and 205 in the state illustrated in FIG. 4 are controlled according to the above-described method, the control target value of the base station 203 is between the control target values of the other two base stations 204 and 205 and thus is not changed. The base station 204 has the lowest control target value in the group and thus repeats a control operation of a control step S11 (corresponding to one up arrow in FIG. 4) three times.

The base station 205 has the highest control target value in the group and thus repeats a control operation of a control step S12 (corresponding to one down arrow in FIG. 4) twice. As a result, as illustrated in FIG. 5, the control target values of the base stations 203, 204, and 205 fall into the certain control target range R11.

As described above, in the present embodiment, in order to maintain a certain level of quality in communication with the mobile station in the cell 200, 201, or 202 of the current station, each of the base stations 203, 204, and 205 dynamically manages and controls the control target value of the current station depending on the load state or the environmental condition within the cell 200, 201, or 202. Further, in the present embodiment, in addition to this management and control, by applying the above-described control method, it is possible to perform the autonomous control operation balanced within the group while exchanging information on the control target values of the base stations 203, 204, and 205 among the groups.

Figure 6:
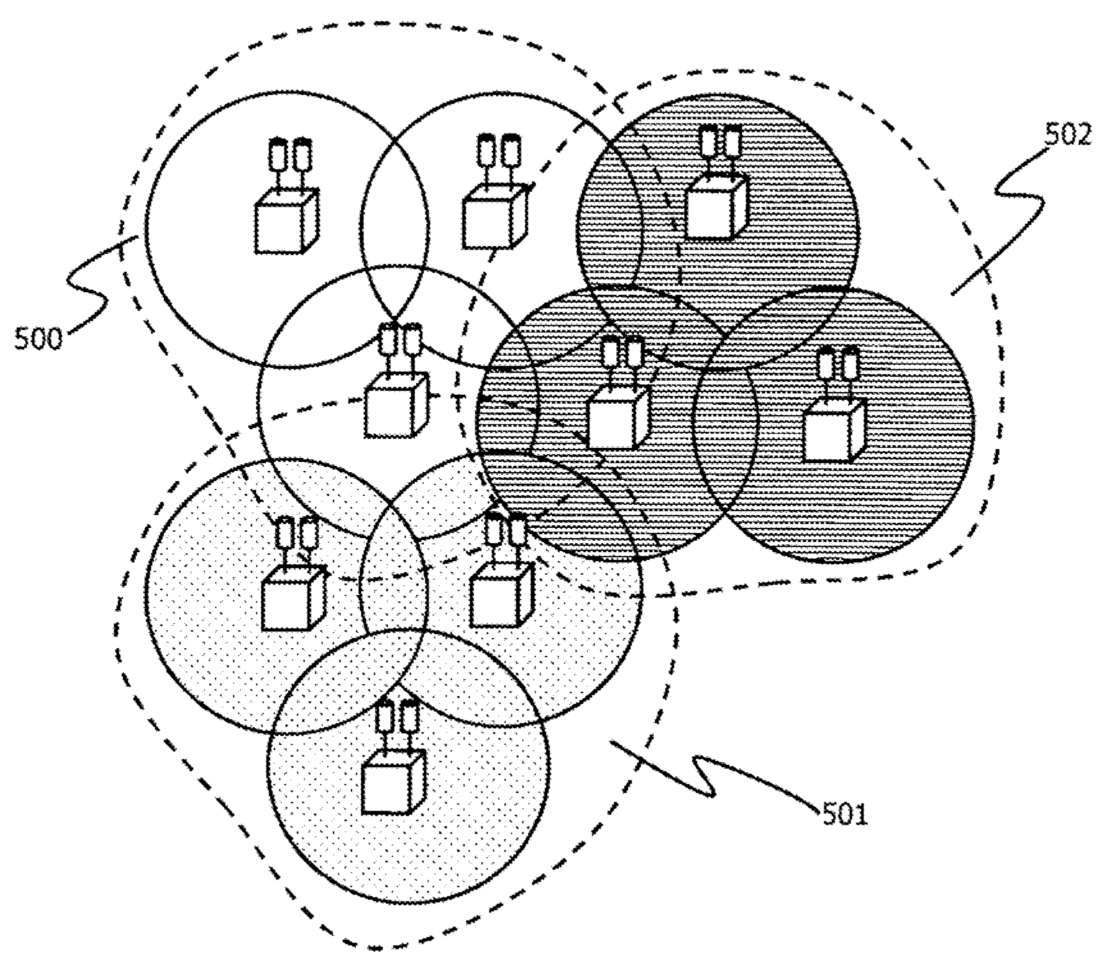
FIG. 6 is a block diagram illustrating an example of the configuration of a mobile communication system according to a second embodiment of the present invention.

FIG. 6 is a block diagram illustrating an example of the configuration of a mobile communication system according to a second embodiment of the present invention. In FIG. 6, in the present embodiment, three groups each including three base stations are collectively treated as a group cluster, and the control flow illustrated in FIG. 2 is applied among groups 500, 501, and 502 disposed adjacent to one another.

Figure 7:
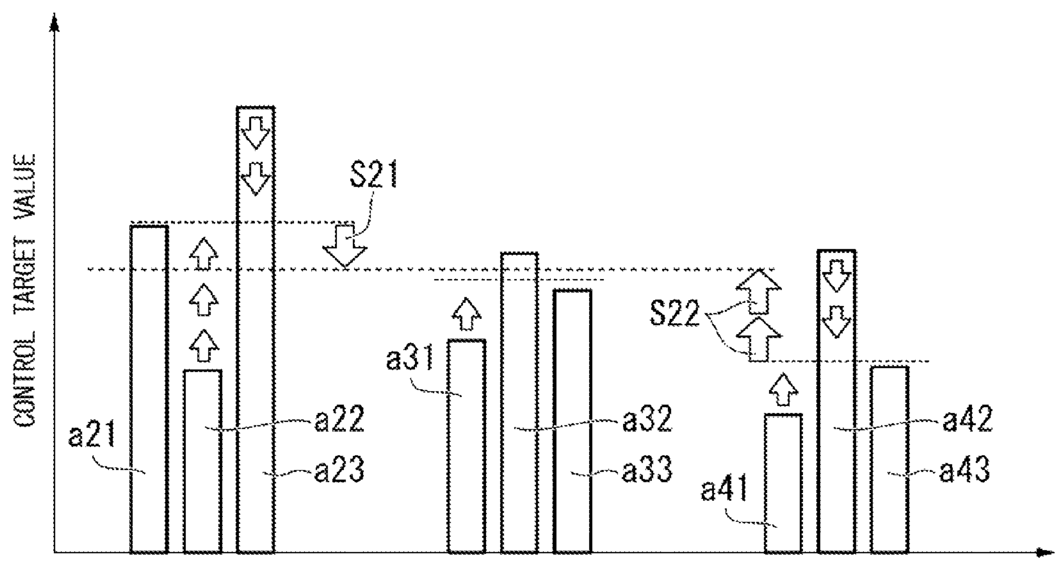
FIG. 7 illustrates states of control target values of base stations at an arbitrary time according to the second embodiment of the present invention.
Figure 8:
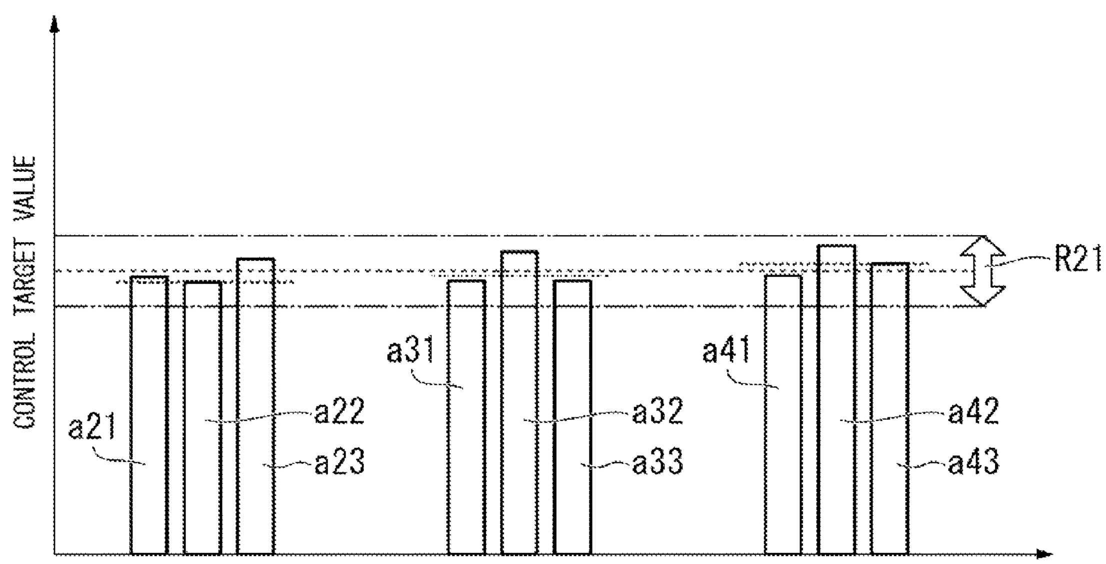
FIG. 8 illustrates states of control target values of base stations after a transmission power control method according to the second embodiment of the present invention is applied.

FIG. 7 illustrates states of the control target values of the base stations at an arbitrary time according to the second embodiment of the present invention. FIG. 8 illustrates states of the control target values of the base stations after a transmission power control method according to the second embodiment of the present invention is applied. Graphs a21, a22, and a23 indicate control target values of three base stations belonging to the group 500. Graphs a31, a32, and a33 indicate control target values of three base stations belonging to the group 501. Further, graphs a41, a42, and a43 indicate control target values of three base stations belonging to the group 502.

An operation of the mobile communication system according to the second embodiment of the present invention will be described with reference to FIG. 2 and FIGS. 6 to 8. However, each base station of FIG. 2 is read as a group, and the group of FIG. 2 is read as the group cluster.

In the present embodiment, the value of the base station having an intermediate control target value within each group is mutually reported among the groups 500, 501, and 502 as the control target value of each group. In the present embodiment, when the control target value of each group is within a previously determined certain range, the process is terminated without changing the control target value of each group.

In the present embodiment, when the control target value of the current group is the highest among the groups 500, 501, and 502, the control target value of the current group is decreased (the processes of steps S3 and S4 in FIG. 2). On the other hand, when the control target value of the current group is the lowest, the control target value of the current group is increased (the processes of steps S5 and S6 in FIG. 2).

When the control target values of the groups 500, 501, and 502 in FIG. 6 are controlled according to the above-described method, the group 501 has the intermediate control target value between the control target values of the other two groups 500 and 502 and thus does not change its control target value.

The group 502 has the lowest control target value among the groups 500, 501, and 502 and thus repeats the control in a control step S22 (corresponding to one large up arrow in FIG. 7) twice.

The group 500 has the highest control target value among the groups 500, 501, and 502 and thus repeats the control in a control step S21 (corresponding to one large down arrow in FIG. 7) once. As a result, as illustrated in FIG. 8, the control target value of each of the base stations 500, 501, and 502 falls into a certain control target range R21.

As described above, in the present embodiment, as the above-described control method is applied, it is possible to autonomously control the control target value over a wide range in the network and flexibly cope with the growth or change of the network without concentrating a load on a specific base station.

INDUSTRIAL APPLICABILITY

The present invention can be applied to mobile communication and wireless communication.

The invention claimed is:

1. A mobile communication system comprising base stations, including a current station and other base stations, wherein the current station comprises:

a report unit which exchanges a current target value of communication quality for a mobile station with the other base stations;

a comparison unit which compares a current target value of the current station with target values of the other base stations; and a management unit which changes the current target value of the current station based on the comparison result of the comparison unit, wherein the comparison unit determines whether the current target value of the current station and the target values of the other base stations are within a control target range, the management unit maintains the current target value of the current station when all of the current target value of the current station and the target values of the other base stations are within the control target range, the management unit decreases the current target value of the current station when at least one of the current target value of the current station and the target values of the other base stations is out of the control target range, and the current target value of the current station is higher than each of the target values of the other base stations, the management unit increases the current target value of the current station when at least one of the current target value of the current station and the target values of the other base stations is out of the control target range, and the current target value of the current station is lower than each of the target values of the other base stations, and the management unit maintains the current target value of the current station when the current target value of the current station is between the target values of the other base stations.

2. The mobile communication system according to claim 1, wherein the report unit reports the current target value to adjacent base stations.

3. The mobile communication system according to claim 1, wherein the report unit reports a current target value of a current station group to adjacent base station groups, and receives, from the adjacent base station groups, reports of target values of the adjacent base station groups.

4. The mobile communication system according to claim 3, wherein the adjacent base station groups are at least two other base station groups, the management unit decreases the current target value of the current station group when the current target value of the current station group is higher than the target values of the at least two other base station groups, the management unit increases the current target value of the current station group when the current target value of the current station group is lower than the target values of the at least two other base station groups, and the management unit does not change the target value of the current station group when the target value of the current station group is between the target values of the at least two other base station groups.

5. Abuse station comprising:

a report unit which exchanges a current target value of communication quality for a mobile station with other base stations;

a comparison unit which compares a current target value of a base station with target values of the other base stations; and a management unit which changes the current target value based on the comparison result of the comparison unit, wherein the comparison unit determines whether the current target value of the base station and the target values of the other base stations are within a control target range, the management unit maintains the current target value of the base station when all of the current target value of the base station and the target values of the other base stations are within the control target range, the management unit decreases the current target value of the base station when at least one of the current target value of the base station and the target values of the other base stations is out of the control target range, and the current target value of the base station is higher than each of the target values of the other base stations, the management unit increases the current target value of the base station when at least one of the current target value of the base station and the target values of the other base stations is out of the control target range, and the current target value of the base station is lower than each of the target values of the other base stations, and the management unit maintains the current target value of the base station when the current target value of the base station is between the target values of the other base stations.

6. The base station according to claim 5, wherein the report unit reports the current target value to adjacent base stations.

7. The base station according to claim 5, wherein the report unit reports a current target value of a current station group to adjacent base station groups, and receives, from the adjacent base station groups, reports of target values of the adjacent base station groups.

8. The base station according to claim 7, wherein the adjacent base station groups are at least two other base station groups, the management unit decreases the current target value of the current station group when the current target value of the current station group is higher than target values of the at least two other base station groups, the management unit increases the current target value of the current station group when the current target value of the current station group is lower than the target values of the at least two other base station groups, and the management unit does not change the current target value of the current station group when the current target value of the current station group is between the target values of the at least two other base station groups.

9. A transmission power control method, causing a current station to execute:

a report process of exchanging a current target value of communication quality for a mobile station with other base stations;

a comparison process of comparing a current target value of the current station with target values of the other base stations; and a management process of changing the current target value of the current station based on the comparison result of the comparison process, wherein the comparison process comprises determining whether the current target value of the current station and the target values of the other base stations are within a control target range, the management process comprises:

maintaining the current target value of the current station when all of the current target value of the current station and the target values of the other base stations are within the control target range;

decreasing the current target value of the current station when at least one of the current target value of the current station and the target values of the other base stations is out of the control target range, and the current target value of the current station is higher than each of the target values of the other base stations;

increasing the current target value of the current station when at least one of the current target value of the current station and the target values of the other base stations is out of the control target range, and the current target value of the current station is lower than each of the target values of the other base stations; and maintaining the current target value of the current station when the current target value of the current station is between the target values of the other base stations.

10. The transmission power control method according to claim 9, wherein the report process comprises reporting the current target value to adjacent base stations.

11. The transmission power control method according to claim 9, wherein the report process comprises:

reporting a current target value of a current a adou group to adjacent base station groups; and receiving, from the adjacent base station groups, reports of target values of the adjacent base station groups.

12. The transmission power control method according to claim 11, wherein the adjacent base station groups are at least two other base station groups, the management process comprises:

decreasing the current target value of the current station group when the current target value of the current station group is higher than the target values of the at least two other base station groups;

increasing the current target value of the current station group when the current target value of the current station group is lower than the target values of the at least two other base station groups; and not changing the current target value of the current station group when the target value of the current station group is between the target values of the at least two other base station groups.

* * * * *